United States Patent [19]

Inoue

[11] 4,393,292
[45] Jul. 12, 1983

[54] METHOD OF AND APPARATUS FOR ELECTRICAL DISCHARGE MACHINING A SMALL AND DEEP HOLE INTO OR THROUGH A WORKPIECE

[75] Inventor: Kiyoshi Inoue, Tokyo, Japan

[73] Assignee: Inoue-Japax Research Incorporated, Yokohama, Japan

[21] Appl. No.: 182,423

[22] Filed: Aug. 29, 1980

[30] Foreign Application Priority Data

| Jul. 17, 1979 | [JP] | Japan | 55-98266 |
| Aug. 30, 1979 | [JP] | Japan | 54-110552 |
| Aug. 31, 1979 | [JP] | Japan | 54-111427 |
| Nov. 6, 1979 | [JP] | Japan | 54-144117 |
| Nov. 29, 1979 | [JP] | Japan | 54-155107 |
| Dec. 27, 1979 | [JP] | Japan | 54-172587 |

[51] Int. Cl.³ ............................................ B23P 1/08
[52] U.S. Cl. ........................ 219/69 M; 219/69 V; 219/69 D
[58] Field of Search ................ 219/69 V, 69 D, 69 M

[56] References Cited

U.S. PATENT DOCUMENTS

| 3,072,777 | 1/1963 | McKechnie | 219/69 V |
| 3,454,737 | 7/1969 | Pfau et al. | 219/69 D |
| 3,758,739 | 9/1973 | DeJongh et al. | 219/69 V |
| 3,928,163 | 12/1975 | Ullmann et al. | 219/69 D |
| 3,939,321 | 2/1976 | Bertrand et al. | 219/69 V |
| 4,208,256 | 6/1980 | Inoue | 219/69 D |

FOREIGN PATENT DOCUMENTS

821718 10/1959 United Kingdom .

*Primary Examiner*—C. C. Shaw
*Attorney, Agent, or Firm*—Karl F. Ross; Herbert Dubno

[57] ABSTRACT

An improved method of and apparatus for the electrical discharge machining of a small and deep hole of a diameter of 1 mm or less and a depth-to-diameter ratio of at least 5 into or through a workpiece wherein a water machining fluid medium is used having a specific resistivity of at least $10^4$ ohm-cm and is pumped through a tubular elongated electrode into the machining gap at a pressure of at least 20 kg/cm², preferably 40 kg/cm². An ultrasonic vibration is imparted to the elongated tubular electrode longitudinally thereof or transversely thereto.

33 Claims, 24 Drawing Figures

METHOD OF AND APPARATUS FOR ELECTRICAL DISCHARGE MACHINING A SMALL AND DEEP HOLE INTO OR THROUGH A WORKPIECE

FIELD OF THE INVENTION

The present invention relates to an electrical discharge machining (EDM) method and apparatus in which a tool electrode is juxtaposed with a workpiece across a fluid filled machining gap and a series of electrical discharge pulses are passed between the tool electrode and the workpiece across the machining gap to remove material from the workpiece. More particularly, the invention relates to an electrical discharge machining method and apparatus of the type described whereby a small and deep cavity, hole or throughgoing-opening is produced in a workpiece.

BACKGROUND OF THE INVENTION

The production of a small and deep hole or of a throughgoing opening of a diameter, say, 1 mm or less and a large depth-to-diameter ratio is extensively required in industry. For example, it is desirable to produce such holes or openings for drawing dies, fuel-injection nozzles in a diesel engine and fiber-spinning nozzles and also to form an initial hole in a workpiece to be machined by a traveling-wire or wire-cutting EDM operation.

It has generally been recognized that machining of these holes, openings or cavities can be achieved by electrical discharge machining with limited advantages because of various complicated measures and machining accessories required. A comparatively long machining time has been required for a comparatively small amount of stock removal and does not justify resort to the EDM technique for machining of small/deep hole formations, especially where the machining is to be carried out on a mass-production basis.

OBJECTS OF THE INVENTION

It is an object of the present invention to provide an improved method and apparatus for electrical discharge machining to allow a small and deep cavity, hole or throughgoing opening to be machined in a workpiece with ease and at an increased speed.

SUMMARY OF THE INVENTION

This and other objects which will become more readily apparent hereinafter are attained in accordance with the present invention by providing, in a first aspect thereof, a method of the electrical-discharge machining of a small and deep cavity, hole or through-opening, hereinafter "hole", into or through a workpiece, the hole having a diameter of 1 mm or less and a depth-to-diameter ratio of at least 5, and even of at least 10, which method comprises the steps of: juxtaposing a thin and elongated tubular electrode with the workpiece across a machining gap; supplying a water machining fluid, preferably of a specific resistivity in excess of $10^4$ ohm-cm through the tubular electrode into the machining gap at a pressure of at least 20 kg/cm², preferably 25 kg/cm², more desirably 40 kg/cm²; applying a series of electrical machining pulses between the tubular electrode and the workpiece to cause time-spaced electrical discharges through the machining gap thereby removing material from the workpiece; and advancing the tubular electrode in its longitudinal direction relatively into the workpiece.

The invention provides, in a second aspect thereof, an apparatus for the electrical-discharge machining of a small and deep hole into or through a workpiece, the hole having a diameter of 1 mm or less and a depth to diameter ratio of at least 5, and even of at least 10, which apparatus comprises a thin and elongated tubular electrode adapted to be juxtaposed with the workpiece across a machining gap; supply and pumping means for delivering a water machining fluid, preferably of a specific resistivity in excess of $10^4$ ohm-cm through the tubular electrode into the machining gap at a pressure of at least 20 kg/cm², preferably 25 kg/cm² and more desirably 40 kg/cm²; power supply means for applying a series of electrical machining pulses between the tubular electrode and the workpiece to produce time-spaced electrical discharges through the machining gap thereby removing material from the workpiece; and drive means for relatively displacing the tubular electrode and the workpiece to cause the tubular electrode to be advanced in its longitudinal direction into the workpiece to form the hole therein or therethrough.

Preferably, a further step or means is included of or for imparting to the tubular electrode an ultrasonic vibration whose frequency preferably ranges in some applications less than 30 kHz, in some other applications in excess of 50 kHz and in still other applications between 1 and 10 MHz.

The vibrational energy of the ultrasonic vibration imparted to the tubular electrode may be held at nil or at a reduced value as long as the machining proceeds under satisfactory gap conditions and may be increased when the gap state is altered into unsatisfactory conditions. The vibration may be imparted to the tubular electrode in its axial direction but is preferably imparted transversely to the axis of the tubular electrode.

The water machining fluid may be a distilled water having a specific resistivity in excess of $10^4$ ohm-cm and means is preferably provided to maintain the temperature thereof at a preselected value or in a preselected range.

The elevated delivery pressure of the water machining fluid is preferably increased continuously or in a plurality of steps as the machining depth of the hole increases.

It has also be found to be advantageous to maintain the amount of the water machining fluid supplied to the machining gap substantially two or more times the amount of gases produced in the machining gap.

As machining or drilling of the hole proceeds in the workpiece with the tubular electrode, a projection formation integral with the workpiece tends to build up in the drilled hole. Thus, in accordance with a further specific feature of the invention, the inner diameter of the tubular electrode is dimensional and the electrical machining conditions in the power supply are preferably set so as to maintain the ratio $l'/l$ to be not greater that $1/5$ where $l$ is the depth of the hole being machined and $l'$ is the height of the projection being formed in the hole.

The supply and pumping means, in accordance with another feature of the aforementioned second aspect of the invention, includes a water supply pump having a delivery pressure of at least 20 kg/cm², preferably 25 kg/cm² and more desirably 40 kg/cm²; pressure-resistant conduit means for feeding the water output of the pump through the tubular electrode into the machining gap defined between the latter and the workpiece and a high-pressure accumulator coupled to the pressure-resistant conduit means between the pump and the tubular electrode.

BRIEF DESCRIPTION OF THE DRAWING

These and other objects, features and advantages of the invention will be more readily appreciated from the following description of certain embodiments thereof made by way of example only and taken with reference to the accompanying drawing in which.

SPECIFIC DESCRIPTION

Figure 1:
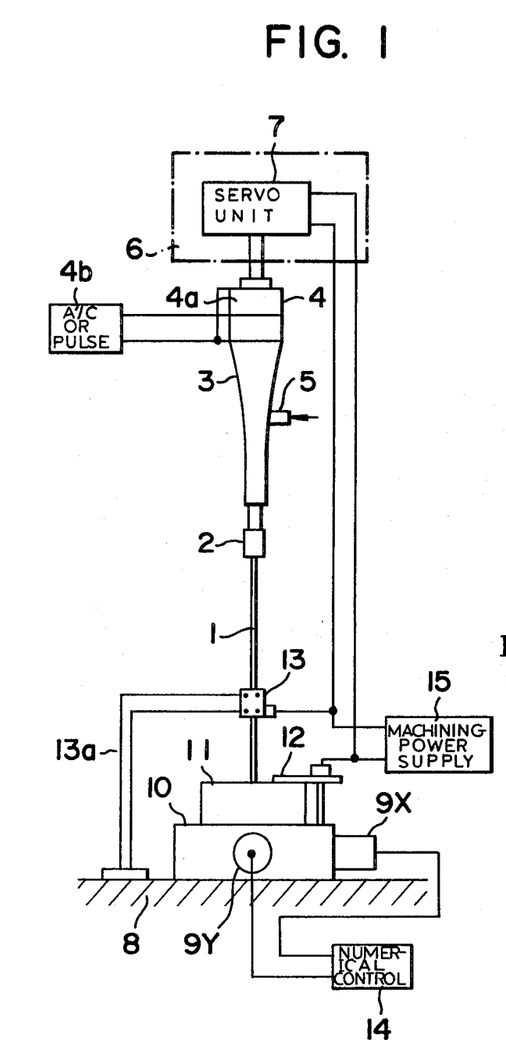
FIG. 1 is a schematic view, partly in section, diagrammatically illustrating an apparatus according to the invention.

Referring first to FIG. 1, an apparatus embodying the present invention makes use of a tool electrode 1 in the form of a slender tube or thin tubular wire. The tubular electrode 1 may be composed of copper, brass or any other suitable material and may have an outer diameter of 0.5 mm and an inner diameter of 0.275 mm and a length of 400 mm.

Figures 2A, 2B:
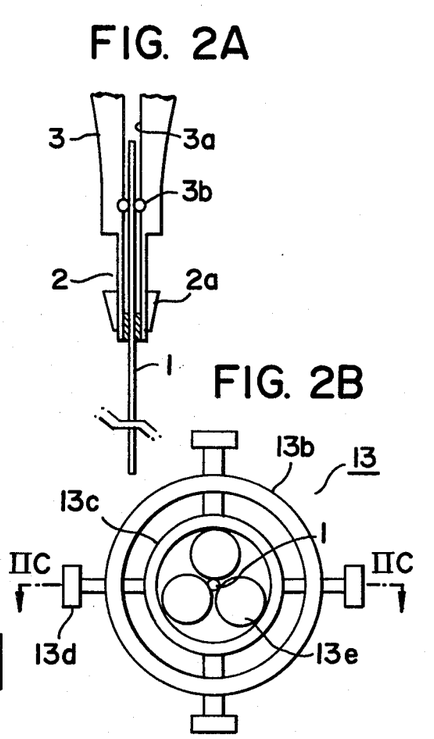
FIG. 2A is a vertical sectional view diagrammatically illustrating a tubular electrode, a support thereof and a portion of an ultrasonic vibratile horn in the apparatus of FIG. 1.
FIG. 2B is a transverse cross-sectional view diagrammatically illustrating an electrode positioning guide structure in the apparatus of FIG. 1.

The electrode 1 is supported by an electrode holder 2 having a chuck 2a as shown in FIG. 2A. The electrode holder 2 extends from a horn 3 of an ultrasonic assembly 4 which may comprise a piezoelectric or electrostriction transducer 4a energized by a high-frequency AC power supply or pulse source 4b with an output frequency, say, of 20 to 30 kHz. As shown in FIG. 2A, the horn 3 is formed with an internal cavity 3a which extends in its longitudinal direction and into which the end of the electrode 1 reaches and where it is tightly held by a packing ring 3b.

The horn 3 has also a liquid supply plug 5 which communicates with a source (not shown) of water machining fluid via a flexible and pressure resistant fluid conduit (not shown) and is open to the cavity 3a to convey the water machining fluid under an elevated pressure into the tubular electrode 1.

The horn and vibrator arrangement 3, 4 carrying the electrode 1 is carried by a ram head 6 mounted on a machine column (not shown) which in turn is mounted upright on a machine bed (not shown). The head 6 contains a servo unit 7 adapted to displace the assembly 3, 4 vertically (i.e. along a Z-axis) and hence the electrode in its longitudinal direction.

A base 8 on the machine bed carries a worktable 10 which in turn carries a workpiece 11 secured thereon by means of a clamp 12. The worktable 10 is in the form of a cross-feed arrangement having a pair of servo motors 9x and 9y and is thereby driven on the base 8 in an X-Y plane orthogonal to the Z-axis to adjust the position of the workpiece 11 relative to the axis of the electrode 1. To provide precise axial positioning, the electrode 1 is slidably guided along a portion of its length on the machining side by a jig unit or holder 13 which is secured on the base 8 by means of an L-shaped arm 13a.

A power supply 15 for providing a succession of electrical machining pulses has one terminal electrically connected to the tool electrode 1 via the guide unit 13 and the other terminal electrically connected to the workpiece 11 via the clamp 12. For a small and deep hole machining operation, it is desirable to have machining pulses of a duration generally not greater than 30 microseconds and preferably around 5 microseconds and the power supply 15 may include a capacitor of a capacitance of 0.1 to 1 microfarad connected across the machining gap G.

The servo motors 9x and 9y may each be a stepping motor or a DC motor equipped with an encoder and/or a rate generator and may be operated by a numerical control (NC) unit 14 for automatically positioning the electrode 1 at one or more predetermined machining positions on the workpiece 11.

Figure 2C:
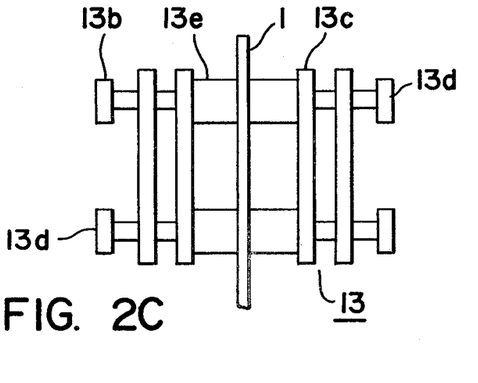
FIG. 2C is a vertical sectional view taken along the line 2C—2C in FIG. 2B.

Referring to FIGS. 2B and 2C, the electrode positioning jig 13 comprises an outer cylinder 13b and an inner cylinder 13c shown arranged generally coaxial with one another. The outer cylinder 13b is fixedly secured to the arm 13a and has at least three bolts 13d threaded through the wall thereof at equi-spaced positions. The ends of the bolts 13d come in engagement with the outer wall of the inner cylinder 13c in which three cylindrical members 13e are snugly accommodated to form an interspacing adapted to slidably receive the electrode 1. The contact positions of the bolts 13d with the inner cylinder 13c are adjusted to accommodate the electrode 1 in the spacing and to establish its proper axial machining position within the jig assembly 13.

Figure 3:
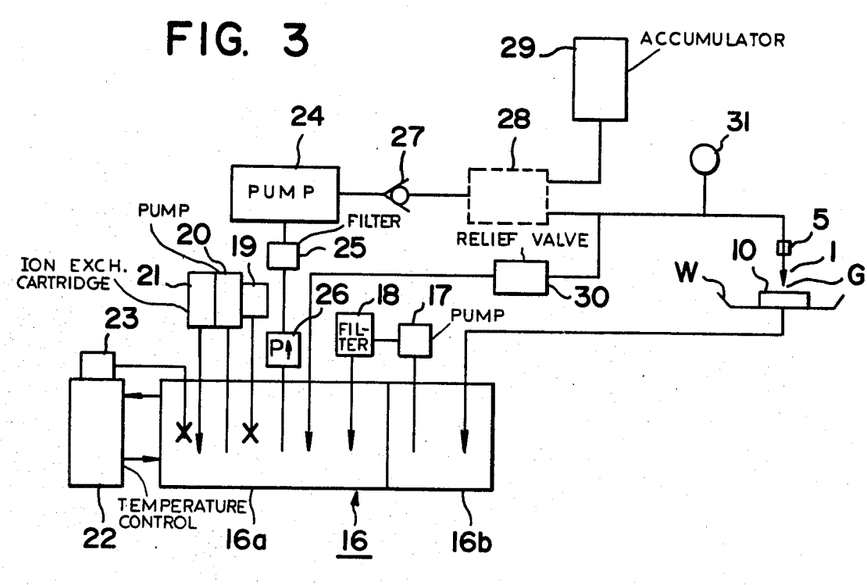
FIG. 3 is a schematic view essentially in block form diagrammatically illustrating a water machining fluid supply system for use, in conjunction with the apparatus of FIG. 1 or any of those shown elsewhere herein, in embodying the present invention.

FIG. 3 shows a fluid supply and circulation system which can be used in conjunction with the electrode assembly 1 and the machining gap (G) in the apparatus of FIG. 1 and any other embodiment hereinafter described. The system includes a reservoir 16 divided into a clean water tank 16a and a spent water tank 16b. The spent water in the tank 16b flows from a worktank or housing W (omitted for illustration in FIG. 1) disposed to carry the workpiece 10 juxtaposed with the tool electrode 1. The machining products, chips or sludges, in the spent machining fluid are allowed to settle in the tank 16b and the purified water is drawn by a pump 17 and fed by an ultrafiltration device or fine filter 18 to the tank 16a.

A conductivity sensor 19 monitors the conductivity or resistivity of the clarified water stored in the tank 16a. When an increased conductivity is sensed or the specific resistivity drops below a preset threshold value, say $4 \times 10^4$ ohm-cm, the sensor 19 acts on a pump 20 to draw the water from the tank 6a and bring it into contact with an ion-exchanger unit in a cartridge 21 to make the water more distilled or less conductive and then permit the water to be returned to the tank 6a. The sensor 19 operates continuously so that the water in the tank 6a may be held substantially at a preset resistivity or conductivity or in a preset range of resistivity, say, of the order of $10^4$ ohm-cm.

A water temperature control unit 22 having a temperature sensor 23 and heater/cooler element (not shown) is also associated with the tank 6a to maintain the water in the tank 6a substantially at an optimum temperature.

Supplying the water machining fluid at an elevated delivery pressure against the conduit resistance generally results in a rise in its fluid temperature. A rise in the temperature also is caused by the action of spark discharges in the machining gap. A rise in the temperature of the water machining fluid causes an increase in its conductivity and at the same time a drop in its viscosity. A drop in the water temperature on the contrary causes an increase in its viscosity which in turn results in a greater resistance of the water to flow through the machining gap. All these tendencies are taken into account, also in conjunction with electrode and workpiece materials, purposes of machining and machining conditions selected, to establish an optimum temperature setting and the desired temperature setting and the desired temperature control is executed.

A high rating pressure delivery pump 24 of plunger or any other type may be used to draw the purified water from the tank 16a directly or, as shown, via a fine filter 25 by means of an auxiliary pump 26 and directs the water to the fluid conduit communicating with the plug 5. The fluid conduit includes a check valve 27 and optionally a high pressure fluid storage chamber 28 and further a high pressure accumulator 29 connected directly to the conduit and preferably to the chamber 28. A relief valve 30 returns a portion of the water supply to the tank 16a and is adjustable to establish and regulate a desired supply pressure of the water machining fluid to the tool electrode 1 and the machining gap G. The pressure is read at a gauge 31. The fluid supply and conduit system is thus designed to ensure delivery of the desired high-pressure water machining fluid with stability to the machining gap via the tool electrode 1. It is apparent that the method of the invention can effectively be carried out with the fluid supply and conduit system of FIG. 3 with the arrangement of FIG. 1.

EXAMPLE I

A tubular copper electrode of an outer diameter of 0.3 mm, an inner diameter of 0.12 mm and a length of 150 mm is used with an arrangement as generally shown in FIGS. 1 to 3 to drill a hole through a stainless (SUS-304 of Japanese Industrial Standard) workpiece of a thickness of 2 mm. The power supply used is a transistor-type EDM generator having a capacitor of 0.1 microfarad connected across the machining gap and adjusted to provide machining pulses with a pulse duration ($\tau on$) of 6 microseconds, a pulse interval ($\tau off$) of 2 microseconds, a no-load voltage (Vo) of 100 volts, a peak current (Ip) of 10 amperes and a mean current (Im) of 2 amperes. The machining fluid is a distilled water of a specific resistivity of $3.5 \times 10^4$ ohm-cm and a temperature of 24° C. and is supplied at various pressures. The machining results are shown by curve A in the graph in FIG. 4 in which the removal rate (mm/min) is plotted along an ordinate in common logarithmic scale and the pressure of the water fluid is plotted along the abscissa also in common logarithmic scale. Corresponding to curve A, the graph of FIG. 4 also carries curve C with the flow quantity (cc/min) and curve D with the flow rate (m/sec) of the water machining fluid plotted along second and third ordinates both here again in logarithmic scale.

Figure 4:
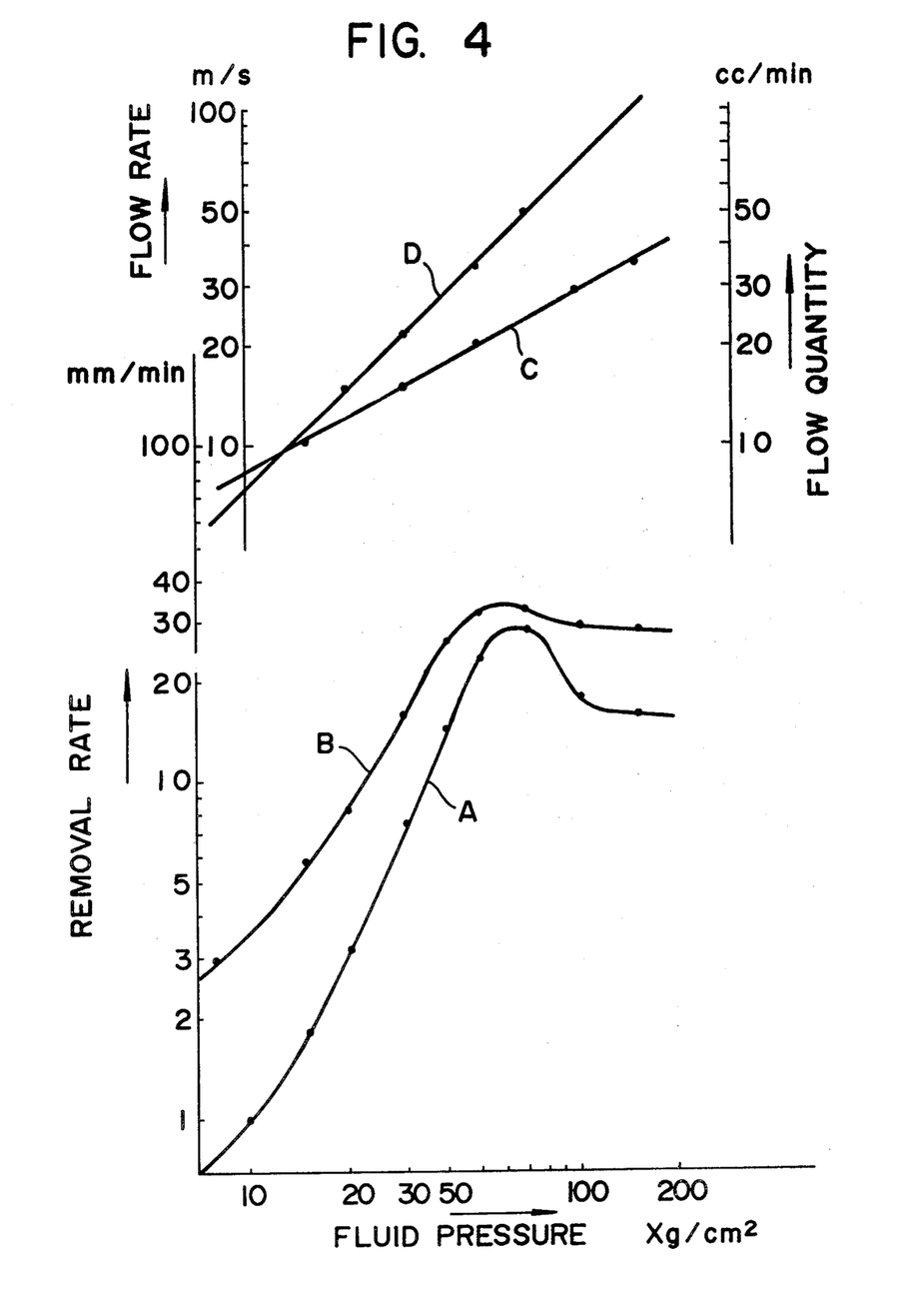
FIG. 4 is a graph illustrating typical machining characteristics gained in accordance with an electrical discharge machining method of the present invention.

From the graphs it can be seen that for given machining conditions, the removal rate is given as a function of the water fluid pressure. Curve A indicates that the removal rate sharply rises in the vicinity where the pressure exceeds 10 kg/cm$^2$, reaches a maximum value (=28 mm/min) when the pressure is about 60 Kg/cm$^2$, and then levels down when the pressure exceeds 70 to 80 kg/cm$^2$, eventually saturating at a constant level. While a precise reason why the level-down occurs has not yet been ascertained, it can be assumed that this is due to the energy density of machining discharges being insufficient to meet with the increased flow quantity or rate of the fluid. When the energy density is increased by changing any one or more of machining pulse parameters: $\tau$on, $\tau$off and Ip and/or changing or eliminating the capacitance of the capacitor to increase the mean current (Im), it is found that the region of saturation of the removal rate shifts towards the higher pressure side and its maximum possible level is increased.

EXAMPLE II

Example I is followed except that the water machining fluid has a temperature of 60° C. and machining pulses have a pulse duration ($\tau$on) of 6 microseconds, a pulse interval ($\tau$off) of 2 microseconds and a peak current (Ip) of 16 amperes and a capacitor of a capacitance of 0.1 microfarad is connected across the machining gap to adjust the mean current at 4 amperes. It is found that with a fluid pressure of 100 kg/cm$^2$, the removal rate reaches 40 mm/min.

In both Example I and II, holes formed through the workpiece have a diameter of 0.35 mm with an overcut of 0.025 mm, a surface roughness of 5 microns Rmax. The relative electrode wear or the electrode wear divided by the workpiece stock removal is proportional to the mean machining current and ranges between 100 and 120%.

It has been found that gases in an amount of 330 to 350 cm$^3$ are generated in the machining process per 1 gram of stock removal of the workpiece, the amount being found to be dependent only upon the machining fluid and independent from electrode and workpiece materials and electrical machining conditions. It has been found advantageous to supply the water machining fluid in an amount two or more times in quantity or volume greater than the gases produced, viz. 660 to 700 cm$^3$ per 1 gram of stock removal.

In the machining of a greater depth to diameter ratio hole or with a greater length to diameter (L/D) ratio electrode, it has been found advantageous to limit the formation of a projection integral with the workpiece in the hole being machined because it tends to cause a short-circuiting between the tool electrode and the workpiece on one hand and also to impede the passage of the water machining fluid through the gap on the other hand. Therefore, preferably the tool electrode should be dimensioned as to its inner diameter and the machining conditions as to, for example, the conductivity of the water machining fluid and parameters of the machining current pulses, should be set so as to limit the formation of the projection to a smallest possible extent.

EXAMPLE III

Example I is followed except that an ultrasonic vibration of a frequency of 28 kHz and an output power of 20 watts is imparted to the tool electrode and the machining results are shown by curve B in the graph in FIG. 4.

It is seen that by imparting an ultrasonic vibration axially to the tool electrode, the removal rate is increased to two to several times greater than without the vibration.

Figure 5:
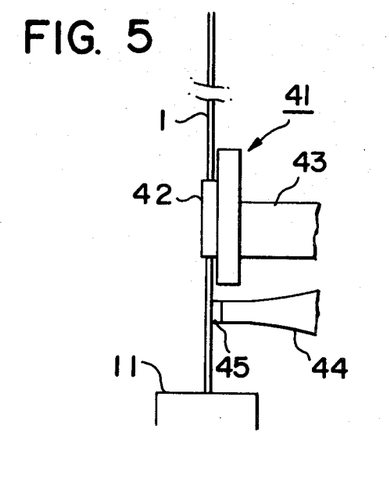
FIG. 5 is a fragmentary vertical view diagrammatically illustrating a preferred arrangement for imparting an ultrasonic vibration to a tubular electrode in accordance with the invention.
Figure 6A:
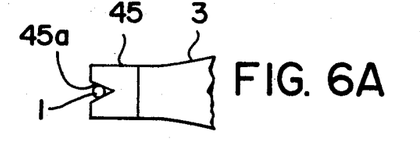
FIGS. 6A and 6B are plan views diagrammatically illustrating certain forms in which the ultrasonic horn is disposed in engagement with the tool electrode, according to the invention.
Figure 6B:
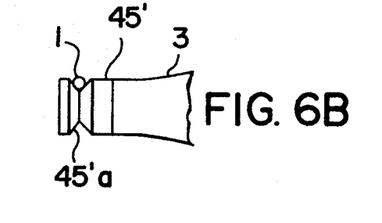

FIG. 5 shows a modified arrangement 41 for imparting an ultrasonic vibration to the tool electrode. The arrangement includes a pipe 42 for coaxially receiving the tubular electrode 1 and having the end plate of an arm 43 welded thereto. An ultrasonic horn 44 has a tip 45 held in tangential engagement and in light contact with the elongated tool electrode. The exemplary forms of the portion of the horn in engagement with the tool electrode are shown in FIGS. 6A and 6B. In the embodiment of FIG. 6A, the tip 45 is formed on its forward surface with an elongated V-slot 45a to slidably receive the electrode 1 therein. In the embodiment of FIG. 6B, the tip 45' is formed with a V-slot ring 45'a with which the tool electrode 1 is brought into engagement transversely to the axis of the horn 44.

In the arrangement of FIG. 5, the tool holder element 42 is advantageously afforded a protection from damage by the ultrasonic vibration. Further, the tool electrode can be rotated during a course of machining without the necessity to rotate the vibrator assembly.

EXAMPLE IV

Workpieces of various materials are machined using copper electrodes and the same electrical pulse conditions as used in Example I, applying a fluid pressure of 50 Kg/cm$^2$ to a water machining fluid as used in Excample I and imparting transversely to the electrode an ultrasonic vibration with a frequency of 28 kHz and an output power of 20 watts. The machining results are summarized in Table below.

TABLE 1

| Workpiece material | Workpiece thickness (mm) | Electrode diameter (mm) | Removal rate (mm/min) | Relative electrode wear (%) | Remarks |
|---|---|---|---|---|---|
| SCM | 2 | 0.3 | 16 | | |
| Bs | 9 | 0.3 | 20 | 40 | |
| SK-5 | 6 | 0.3 | 15 | | |
| WC | 6 | 0.3 | 10 | | |
| SKD-11 | 30 | 0.3 | 17 | 120 | |
| SKD-11 | 30 | 0.5 | 8 | 120 | without capacitor |
| SKD-61 | 14 | 0.3 | 12 | 120 | |
| SUS | 14 | 0.3 | 20 | 80 | |
| SKD-61 | 9 | 0.5 | 19 | 120 | without capacitor |
| SUS | 2 | 0.19 | 15 | 40 | |

The ultrasonic vibration at a frequency in the range between 2 to 30 kHz has been found to provide similar results. Further when the electrode is composed of copper-zinc alloys, tungsten or molybdenum and depending upon the sizes of outer and inner diameters and the length of the tool electrode, lengths of the electrode above and below the holder, the rate of flow of the water machining fluid and the mean machining current density, it has been found that a frequency in the range between 50 kHz and 100 kHz or a frequency in the range between 1 and 10 MHz, say, 1.6 MHz with 5 watts are satisfactory and may yield even a better result than the frequency of 25 kHz with 10 watts.

The ultrasonic vibration may be generated by means of an electrostrictive or magnetostrictive element. Besides, a combination of an electric field and a magnetic field may be utilized. In electrical discharge machining, an electric current is passed through the electrode intermittently at a high frequency, say, 100 KHz and the alternating electric field arising from this intermittent current passage can be used in conjunction with a unidirectional or alternating magnetic field which may externally be applied orthogonally to the tool electrode to produce an ultrasonic vibration of the tool electrode.

There is thus provided an improved EDM method and apparatus which permits a hole of a diameter as small as 1 mm or less and a depth to diameter ratio as large as 5 to 10 to be machined efficiently.

Figures 7, 8, 9:
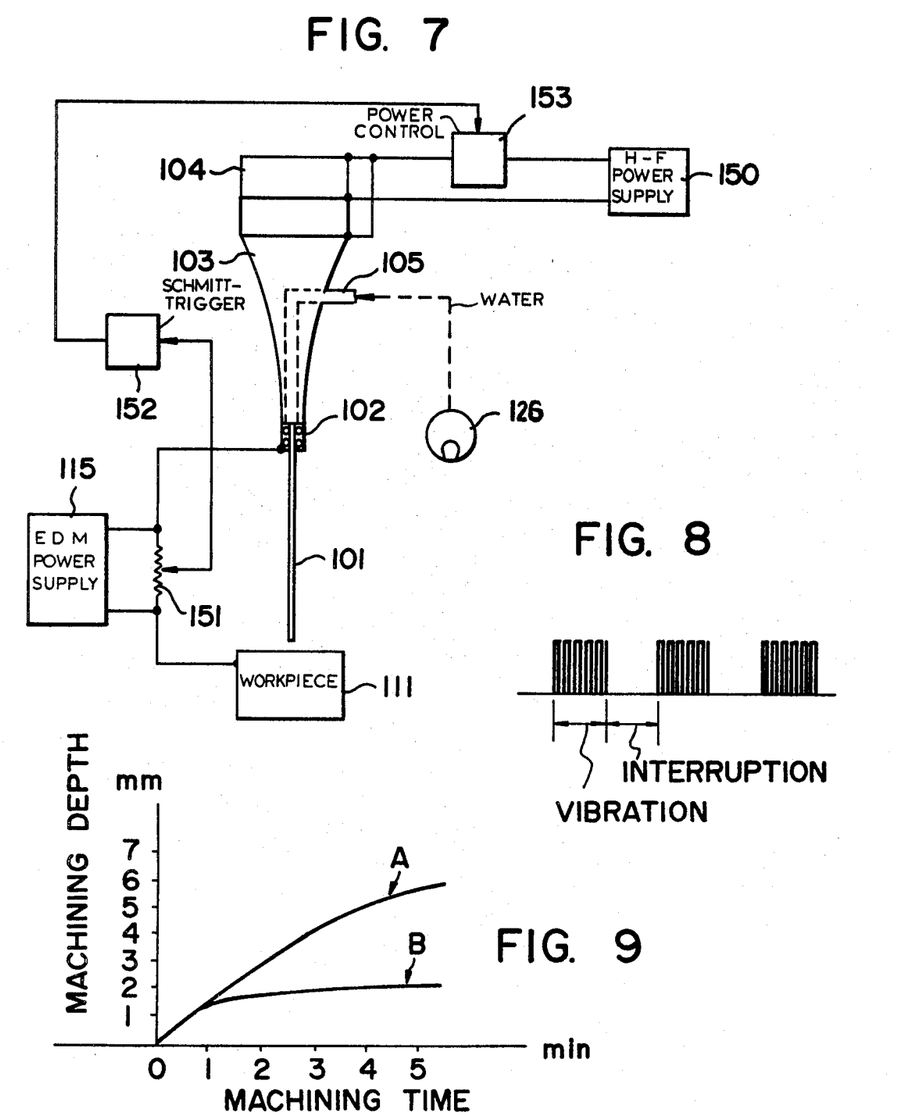
FIG. 7 is a schematic view diagrammatically illustrating an apparatus including an ultrasonic vibration system for controlling the amplitude of the vibration imparted to the tubular electrode while responding to the machining gap condition in accordance with a further feature of the invention.
FIG. 8 is a waveform diagram illustrating a modified series of vibration signals to be imparted to the tubular electrode in accordance with the invention.
FIG. 9 is a graph showing a comparison of machining characteristics gained in the system of FIG. 7 under different sets of machining conditions.

In a further embodiment of the invention shown in FIG. 7, a slender tube or thin tubular wire electrode 101 juxtaposed with a workpiece 111 is supported by a chuck 102 formed at the end of a horn 103 energized by an ultrasonic vibrating element 104 and a high pressure water machining fluid from a source 126 is introduced through a plug 105 into the electrode 101 and supplied to the machining gap G while machining pulses are applied from an EDM power supply 115 between the tool electrode 101 and the workpiece as previously described. The vibrating element 104 is energized by a high-frequency power supply 150 to produce an ultrasonic vibration signal which is amplified by the hown 103 and thereby transmitted to the tool electrode 1 to cause it to vibrate at a frequency in the range between 1 to 1000 kHz. The high-frequency vibration of the electrode 101 serves to promote the removal of machining products from the region of the machining gap G while promptly extinguishing an arc discharge or short-circuiting as it occurs between the tool electrode 101 and the workpiece 111, thus permitting machining discharges to be repetitively produced through the gap G with an enhanced stability. The amplitude of the vibration ranges between 3 and 20 microns.

In the system of FIG. 7, the power supply circuit includes a gap voltage detector, shown by a resistor 151 connected across the machining gap G, to monitor the condition of the machining gap G. Thus, a signal develops at the resistor 151 representing the mean machining voltage across the gap G and is fed to a threshold circuit 152, e.g. a Schmitt trigger or a combination of Schmitt-trigger circuits, which has a single or a plurality of threshold levels preset therein and an output fed to a control circuit 153 for controlling the output power of the high-frequency power supply 150. When the threshold circuit 152 indicates an increased gap mean voltage, the control circuit 153 acts on the power supply 150 so as to reduce its output power supplied to the element 104 thereby reducing the amplitude of a vibration imparted to the electrode 101. When the threshold circuit 152 indicates a reduced gap mean voltage, the control circuit 153 acts on the power supply 150 so as to increase its output power supplied to the element 104 thereby increasing the amplitude of vibration imparted to the electrode 101. An optimized mode of vibration of the electrode 101 in response to the gap voltage representing changes in the gap condition is thus achieved. When the gap voltage drops below a preselected value reflecting an excessive accumulation of machining products in the gap G which tends to cause an arc discharge, the amplitude of vibration is increased to a higher value, say, 10 microns to facilitate removal of the accumulated machining products. The effect is particularly large in drilling a small hole and permits a small hole to be drilled to an increased depth and in a reduced time.

EXAMPLE V

A WC-4%Co workpiece is drilled with a tubular copper electrode of 0.5 mm diameter and using a water machining fluid of a specific resistivity of $10^5$ ohm-cm at a room temperature. A high-frequency vibration at a frequency of 28 kHz is applied to the electrode and machining pulses have a pulse duration ($\tau$on) of 1 microsecond, a pulse interval (off) of 3 microseconds, a peak current (Ip) of 20 amperes and a mean current (Im) of 4.5 amperes. The mode of vibration is controlled in response to the machining gap condition in such a manner that when the gap voltage exceeds 20 volts, the vibration has an amplitude reduced to 10 to 20 microns and when the gap voltage drops below 20 volts, the vibration has an amplitude increased to 30 to 50 microns. The relationship between the machining depth and the machining time is represented by curve A in the graph A of FIG. 9. Curve B in the same graph shows the corresponding relationship found in the case where the amplitude of vibration is held at a constant value in the range between 10 and 20 microns. It is seen that the gap voltage responsive amplitude control permits machining to continue without substantial drop in removal rate with increase in machining depth and increases the practical limit of the machining depth.

FIG. 8 shows the waveform of a modified output signal of the high-frequency power supply 150 for energizing electrical-mechanical transducer element 104. The signal comprises a series of time-spaced trains of pulses in which the pulses are produced at a high frequency, say, 28 kHz and are periodically interrupted at a low frequency, say, 100 Hz to 10 kHz, to provide intermittently occurring trains. Accordingly the horn 103 transmits the modified vibration signal to vibrate the tool electrode 101 intermittently. This form of vibration has been found to be advantageous to avoid an excessive heating at the holder or interfacial portion (chuck) 102 and its consequential damage.

Figure 10:
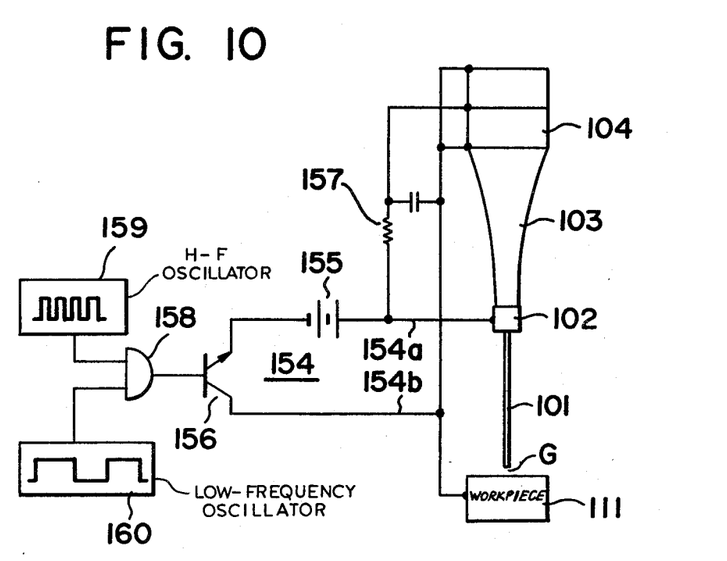
FIG. 10 is a schematic view diagrammatically illustrating an apparatus including a signal source for energizing the EDM power supply and the ultrasonic vibrator in accordance with a further feature of the invention.

In the arrangement of FIG. 10, a single power supply 154 is used both to provide machining pulses between the tool electrode 101 and the workpece 111 and to energize the electromechanical transducer 104 for vibrating the electrode 101. In this embodiment as well, the horn 103 as the vibration amplifier is shown supporting longitudinally the tool electrode 101 and having them coupled at a holder 102.

Figure 11:
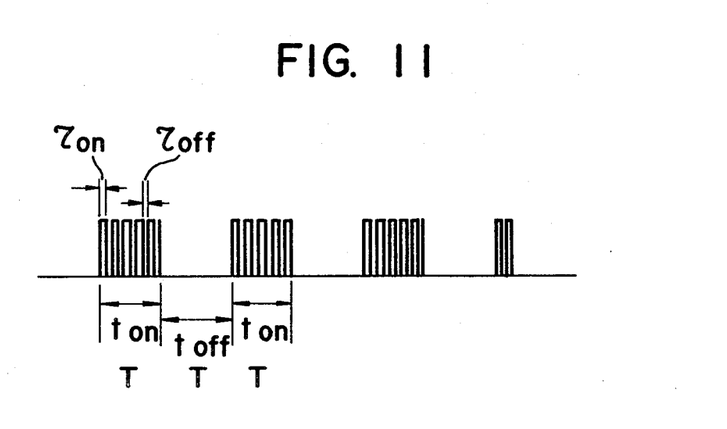
FIG. 11 is a waveform diagram illustrating a series of signal pulses in time-spaced succession produced from the signal source of FIG. 10.

The power supply 154 here comprises a DC source 155 and a power switching transistor 156 whose principal electrodes are connected in series with the DC source 155 across load terminals 154a and 154b which are on one hand connected to the tool electrode 101 and the workpiece 111 and on the other connected to the transducer 104 via an RC coupling 157 which constitutes a filter network. The control electrodes of the switch 156 are fed by an AND gate 158 having a first input fed by a high-frequency oscillator 159 and a second input fed by a low-frequency oscillator 150. The oscillator 159 provides output signal pulses of a frequency between 100 kHz and 10 MHz and an on-time $\tau$on and an off-time $\tau$off while the oscillator 160 provides output signal pulses of a frequency between 10 kHz and 100 kHz and having an on-time Ton and an off-time Toff. The logical-product coupling of the outputs of the two oscillators 159 and 160 by the gate 158 produces signal pulses in a succession of time-spaced trains as shown in FIG. 11 at the input to the transistor 156 and hence across the output terminals 154a and 154b of the power supply 154.

A succession of trains (Ton, Toff) of pulses (τon, τoff) are on one hand applied across the tool electrode 101 and the workpiece 111 to produce the corresponding trains of machining pulses across the gap G flooded with the water machining fluid under an elevated pressure as described previously to remove material from the workpiece 111. On the other hand the same trains of signal pulses are applied via the filter 157 to energize the transducer 104 to bring the tool electrode 101 into an intermittent vibration with a duration of vibration Ton and a duration of interruption or an interval of successive vibrations Toff.

EXAMPLE VI

A WC-4%Co workpiece is machined with an arrangement generally shown in FIG. 10 and using a tubular copper electrode of 0.5 mm diameter and a distilled water as the machining fluid of a specific resistivity of $10^5$ ohm-cm. The high-frequency oscillator 159 has an output frequency of 200 kHz while the low-frequency oscillator 160 has an output frequency of 28 kHz. When the machining pulses have a mean machining current of 4.5 amperes, a hole of 6 mm depth is machined in the workpiece in a period of 5 minutes.

Figures 12, 13:
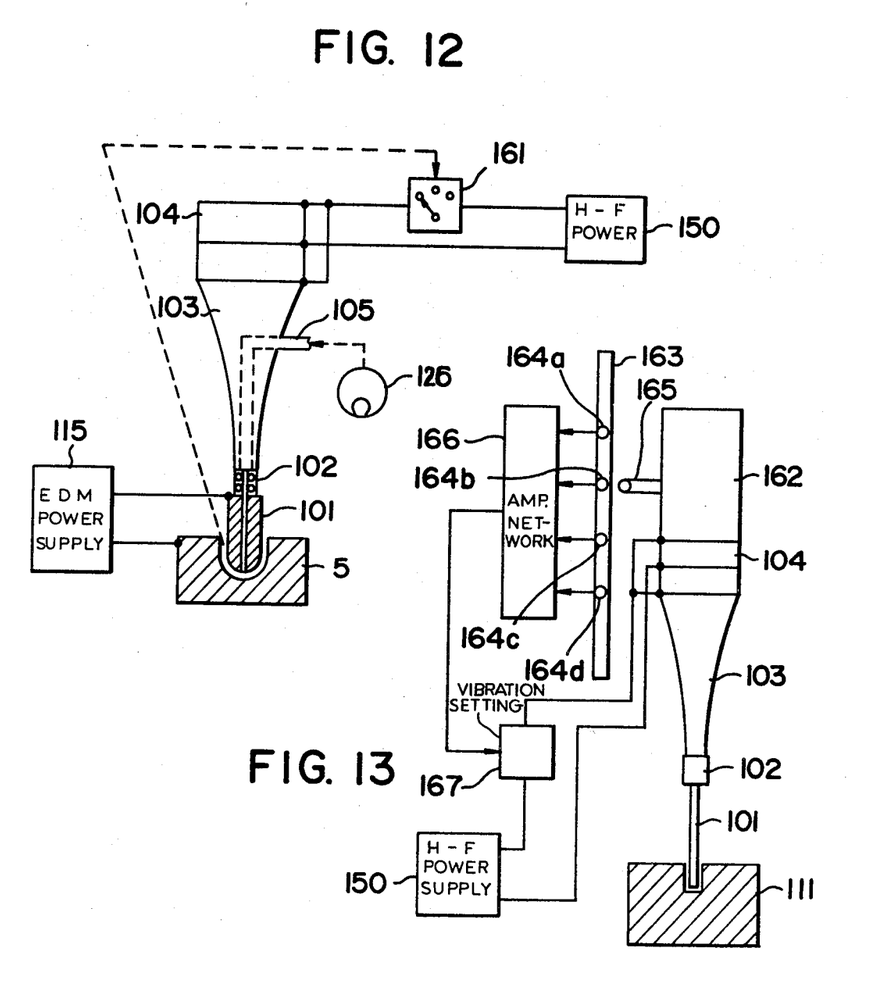
FIG. 12 is a schematic view diagrammatically illustrating an apparatus with means for changing the amplitude of the ultrasonic vibration according to machining purposes in accordance with a further feature of the invention.
FIG. 13 is a schematic view diagrammatically illustrating an apparatus with means for changing the amplitude of the ultrasonic vibration in response to the progress of an EDM operation in accordance with a further feature of the invention.

The arrangement of FIG. 12 includes a setting unit 161 for selectively changing the output power of the high-frequency power supply 150 for energizing the transducer 104, thereby selectively changing the amplitude of vibration imparted to the tool electrode 101, say in three steps: (1) 3 to 10 microns, (2) 10 to 20 microns and (3) 20 to 50 microns. Selective changes in the amplitude of vibration have been found to be desirable according to particular machining purposes, for example, when different overcuts are desired.

EXAMPLE VII

A ferrous workpiece is machined using a copper electrode and a water machining fluid of a specific resistivity of $10^5$ ohm-cm. Machining pulses have an on-time τon=10 microseconds and an off-time τoff=10 microseconds. A hole of 10 mm depth is machined while vibrating the tool electrode at a frequency of 28 kHz and with various amplitudes. The hole has an overcut of 32 microns when no vibration is imparted, an overcut of 45 microns when the vibration has an amplitude of 5 microns, an overcut of 82 microns when the vibration amplitude is 20 microns and an overcut of 170 microns when the amplitude is 50 microns.

It is seen that with no change in electrical machining settings, a desired overcut is obtainable simply by adjusting the amplitude of vibration imparted to the tool electrode. The setting unit 153 may be formed with a plurality of setting positions which can be selectively set in accordance with a particular overcut desired. The setting can also be switched from one position to another during a given course of machining operation where the hole should have stepped overcuts in the direction of its depth.

An embodiment of the invention shown in FIG. 13 is designed to change the amplitude of vibration imparted to the tool electrode 101 as a function of the depth of a hole being machined in the workpiece. In this embodiment the horn 103 is shown carried by a head 162 to displace the tool electrode 101 vertically in its longitudinal direction into the workpiece 111. A detector plate 163 is disposed in parallel with the displacement of the head 162 and has a plurality of photoelectric transducers 164a, 164b, 164c and 164d adapted to receive light from a lamp 165 attached to the head 162. As the head 162 moves downwardly, the photoelectric transducers 164a, 164b, 164c and 164d are actuated in sequence in response to light from the lamp 165 to furnish electric signals. Each such electrical signal is applied to an amplifier/coupling network 166. A control signal representing the position of the head 162 thus develops at the output of the network 166 and is applied to a vibration setting unit 167 connected between the high-frequency power supply 150 and the electromechanical transducer 104 and switches the setting in the unit 167 from the position of lower vibrational amplitude to the position of a higher vibrational amplitude.

EXAMPLE VIII

A WC-Co workpiece is machined using a copper electrode of 0.5 mm diameter and a water machining fluid of a specific resistivity of $10^5$ ohm-cm. Machining pulses have a pulse duration of 1 microsecond and a pulse interval of 3 microseconds while an ultrasonic vibration is imparted to the tool electrode sinking into the workpiece. When the vibration has an amplitude of 10 microns up to a depth of 3 to 5 mm and the amplitude is switched to 50 microns when the depth of 5 mm is exceeded, the hole is capable of reaching a depth of 6 mm in a period of 5 minutes.

Figures 14, 15, 21:
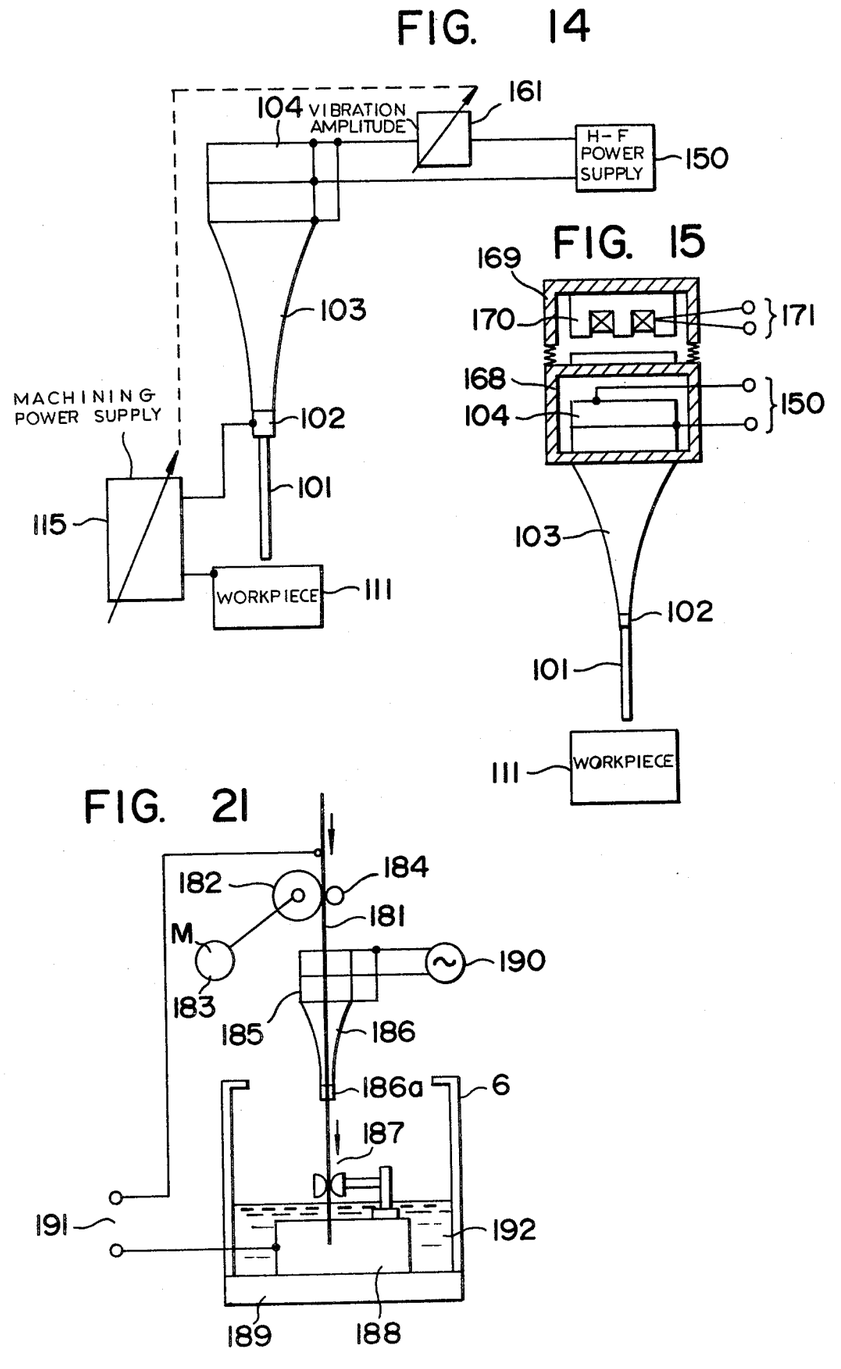
FIG. 14 is a schematic view diagrammatically illustrating an apparatus with means for changing the amplitude of the ultrasonic vibration in conjunction with changes in machining conditions in a given course of EDM operations including roughing and finishing in accordance with a further specific feature of the invention.
FIG. 15 is a schematic view diagrammatically illustrating an apparatus with an vibrator assembly including a high-frequency vibrator and a low-frequency vibrator for imparting a composite vibration to the machining electrode in accordance with a further feature of the invention.
FIG. 21 is a schematic view diagrammatically illustrating an apparatus in which the machining elongated electrode is continuous and fed into the machining zone continuously or successively in accordance with a further feature of the invention.

The machining power supply 115 in the embodiment of FIG. 14 is capable of having electrical pulse conditions varied to establish a plurality of grades of machining ranging from finishing to roughing and is operable in conjunction with a vibrational amplitude setting unit 161 so that the vibration imparted to the tool electrode has a greater amplitude when a roughing condition is set and has a lower amplitude when a finishing condition is set.

In the arrangement of FIG. 15, the vibrator assembly comprises two vibrator units. The high-frequency vibrator 104 energized by the high-frequency power supply 150 is received in a housing 168 which is attached to the top of the horn 103. A second housing 169 is resiliently supported on the first housing 168 and carries a low-frequency vibrator 170, e.g. an electromagnetic vibrator, energized by a low-frequency power supply 171. The low-frequency vibrator 170 produces a vibration of a frequency in the range between 50 and 500 Hz while the high-frequency vibrator 104 produces a vibration of a frequency in the range between 1 and 500 kHz. The vibrations are amplified and superimposed upon one another through the horn 103 and applied to the tool electrode 101. The low frequency vibration may have a fixed amplitude up to 100 microns and the high frequency vibration may be changed in a plurality of steps during a given course of machining operation or may be selectively set according to a particular machining purpose as described before.

Figure 16:
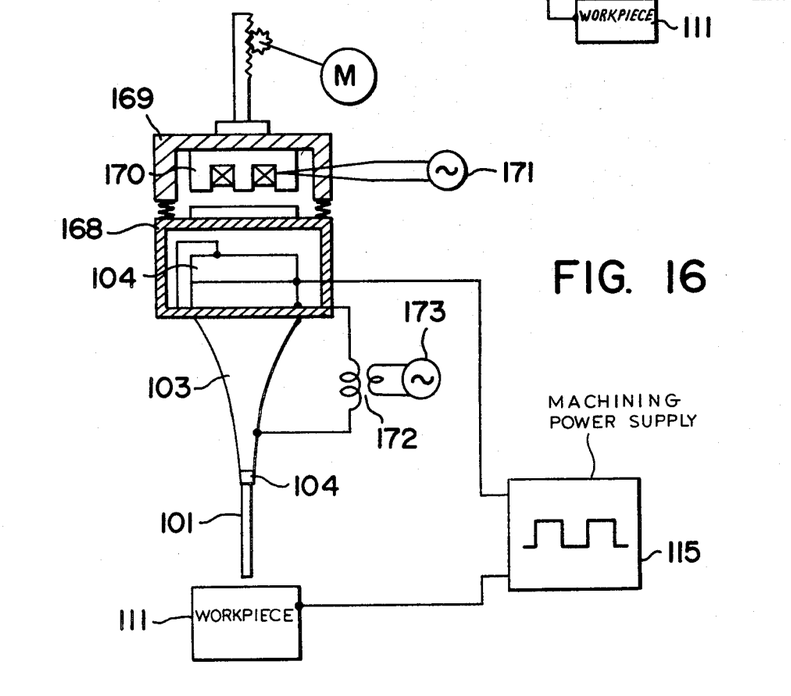
FIG. 16 is a schematic view diagrammatically illustrating a modification of the assembly of FIG. 15.

The arrangement of FIG. 16 is basically the same as that of FIG. 15 except that a feed drive unit 172 for the tool electrode 101 is shown as supporting the housing 169 and the electromechanical transducer 104 for vibrating the tool electrode 101 is energized by the machining power supply 115 via an inductor 173 (L) with which a high-frequency oscillator 174 is coupled. The transducer 104 has a capacitance C and, together with the inductor 173, forms an LC resonant circuit in series with the high-frequency oscillator constituted by the machining power supply 115. The auxiliary oscillator 174 has an output frequency adjustable in the range between 10 and 200 KHz. When machining pulses are passed between the tool electrode 101 and the workpiece from the power supply 115, the LC circuit constituted by the transducer 104 and the inductor 173 is brought into resonance with the machining discharges at the frequency of the oscillator 174 and the resonating current is passed through the transducer 104 to produce an intensified vibration which is transmitted via the horn 103 to the tool electrode 101.

Figure 17:
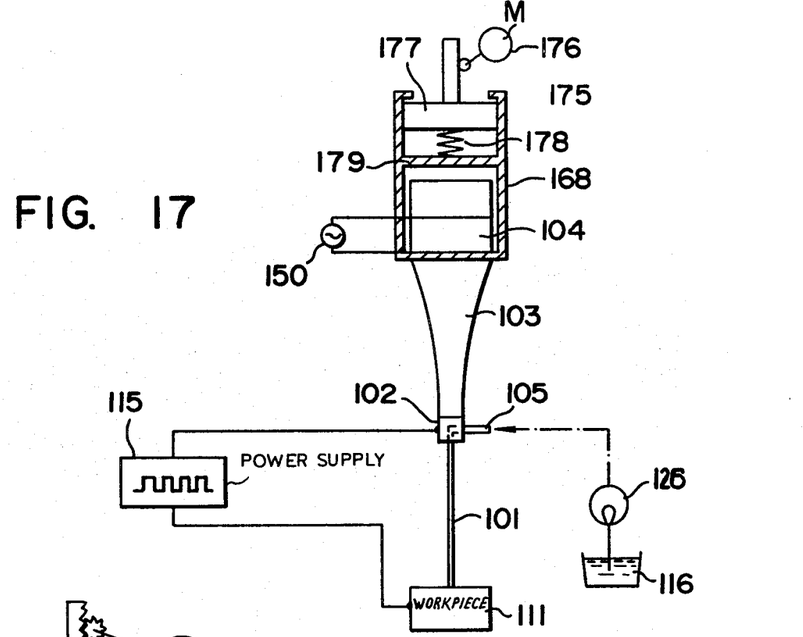
FIG. 17 is a schematic view diagrammatically illustrating an apparatus which may be used to carry out a method of the present invention.

In accordance with a further embodiment of the method of the invention, the tool electrode is held under ultrasonic vibration in light contact with the workpiece. In the arrangement of FIG. 17, the electromechanical transducer 104 received in the housing 168 produces an ultrasonic vibration in the frequency range of 5 to 100 kHz which is transmitted via the horn 103 to the tool electrode 101 as in the previous arrangements. In this system, the electrode drive unit 175 includes a motor 176 and a piston 177 driven by the motor 176 and resiliently supported by a spring 178 on a fixed plate 179 in the housing 168 to urge the electrode 101 against the workpiece 111. When the transducer 104 is energized by the power supply 150, a contact vibration is thus produced at the tip of the tool electrode 101 against the workpiece 111. A water machining fluid is supplied under an elevated pressure by the pump 126 from the source 116 through the plug 105 and through the internal bore of the tool electrode into the machining gap while machining pulses are passed from the power supply 115 between the tool electrode 101 and the workpiece 111. Because of a contact vibration of the tool electrode 101 against the workpiece, the machining pulses may have a reduced load voltage, say, 5 volts and at most 15 to 20 volts and accordingly a reduced no load or open circuit voltage in the range of 30 to 60 volts since no greater or dielectric breakdown voltage as in the conventional EDM process (100 to 500 volts) is required. The markedly reduced open circuit voltage has been found to yield highly desirable EDM machining results, a reduced surface roughness and an increased machining accuracy. Furthermore, no fine gap dimensional control is required and the impediment to machining discharges by machining chips is substantially reduced in the present system.

EXAMPLE IX

A WC-Co workpiece is machined using a copper electrode of 0.5 mm diameter in an arrangement as generally shown in FIG. 16 and using a water machining fluid of a specific resistivity of $10^4$ to $10^5$ ohm-cm. The ultrasonic vibration to the electrode has a frequency of 28 kHz and an output power of 20 watts while machining pulses have an open circuit voltage of 35 volts and a mean machining current of 4 amperes. It is found that the rate of penetration into the workpiece is approximately 8 mm/min and the relative electrode wear is approximately 3%.

Figures 18, 19:
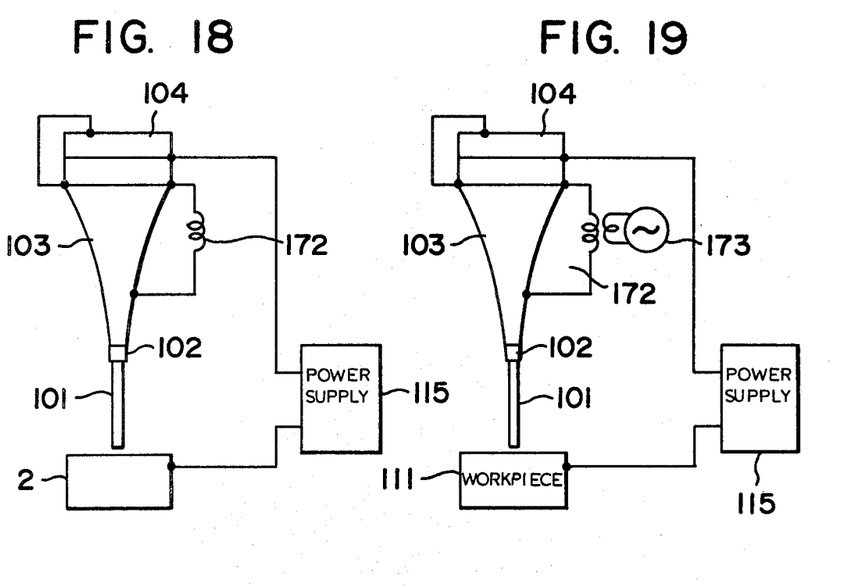
FIGS. 18, 19 and 20 are schematic views diagrammatically illustrating various arrangements using an EDM power supply and a series L/C circuit across the machining gap operative in resonance with the output of the power supply for producing an ultrasonic vibration and imparting the vibration to the machining electrode in accordance with a further feature of the invention.
Figure 20:
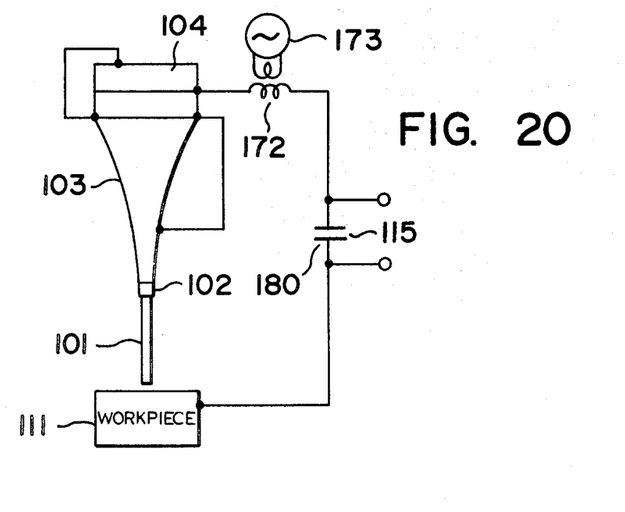

FIGS. 18, 19 and 20 show various circuit arrangements including a resonant network for energizing the electromechanical transducer 104. In the arrangement of FIG. 18, an inductance 173 (L) is connected with a capacitance (C) of the transducer 104 to form a series LC circuit in series with the power supply 115 and the machining gap. the arrangement of FIG. 19 is identical to that shown in FIG. 16. In the arrangement of FIG. 20, the power supply 115 includes a capacitor 180 which is charged by a DC source directly or a pulse source (not shown) and discharged through the machining gap between the tool electrode 101 and the workpiece 111. In the discharge circuit of the capacitor, the capacitance (C) of the transducer 104 and the inductance 173 constitutes an LC circuit. A high-frequency auxiliary oscillator 174 is coupled with the inductance 172 and has an output frequency adjusted in the range of 10 to 200 kHz. As machining pulses are generated, as a result of periodic discharging of the capacitor 180, between the tool electrode 101 and the workpiece 111, the LC circuit 104, 173 is brought into resonance with the machining discharges at the frequency of the source 174 and the resonant current is passed through the transducer 104 to produce an intensified vibration which is transmitted via the horn 103 to the tool electrode 101. In each of the arrangements of FIGS. 18 to 20, a portion of the machining power is effectively utilized to produce the desired vibration of the tool electrode 101.

In a further embodiment of the invention as shown in FIG. 21, the tool electrode may be a continuous wire 181 supplied from a source (not shown) and driven between a drive roller 182 rotated by a motor 183 and a pinch roller 184. The wire electrode 181 is passed through a bore formed longitudinally through an electromechanical transducer 185 and a horn 186, between a pair of guide surfaces 187 and eventually into a workpiece 188 mounted in a worktank 189. The transducer 185 is energized by a high-frequency power supply 190 to produce a mechanical oscillation which is transmitted via the horn 186 to impart an ultrasonic vibration to the electrode 181 in its axial direction. Machining pulses are applied by an EDM power supply 191 between the tool electrode and the workpiece 188 across the machining gap flooded with a water machining fluid 192 collected in the worktank 189. The horn 186 has a slip ring at its end 186a through which the electrode 181 is slidably passed while acquiring the ultrasonic vibration from the horn body 186. A servo system (not shown) is provided to sense the drilling progress in the workpiece 188 and the wear of the wire electrode 181 and act on the motor 183 to execute the follow-up feed of the wire electrode 181 by the rollers 182 and 184. The electrode guide surfaces 187 serve to eliminate substantially the component of vibration transverse to the axis of the wire electrode 181.

What is claimed is:

1. A method of electrical discharge machining a small and deep hole having a diameter of 1 mm or less and a depth to diameter ratio of at least 5 into or through a workpiece, the method comprising the steps of: juxtaposing a thin and elongated tubular electrode with the workpiece across a machining gap; supplying a water machining fluid through the tubular electrode into the machining gap at a pressure of at least 20 kg/cm$^2$; applying a series of electrical machining pulses between the tubular electrode and the workpiece to cause time-spaced electrical discharges through the machining gap thereby removing material from the workpiece; and advancing the tubular electrode in its longitudinal direction relatively into the workpiece.

2. The method defined in claim 1 wherein said pressure is at least 25 kg/cm$^2$.

3. The method defined in claim 2 wherein said pressure is at least 40 kg/cm$^3$.

4. The method defined in claim 1 wherein said water machining fluid is of a specific resistivity of at least $10^4$ ohm-cm.

5. The method defined in claim 1, claim 2, claim 3 or claim 4 wherein said depth to diameter ratio is at least 10.

6. A method as defined in claim 1, further comprising the step of maintaining the resistivity of said water machining fluid substantially constant.

7. A method as defined in claim 6, further comprising the step of maintaining the temperature of said water machining fluid substantially constant.

8. A method as defined in claim 1, further comprising the step of increasing said pressure of the water machining fluid as a function of the depth of the hole being machined in the workpiece.

9. A method as defined in claim 1, further comprising the step of maintaining the amount of the water machining fluid supplied to the machining gap substantially two or more times by volume of the amount of gases produced in the machining gap.

10. A method as defined in claim 1 wherein a projection integral with the workpiece is formed in the machined hole, further comprising the step of controlling the ratio $l'/l$ to be not greater than 1/5 where $l$ is the depth of the hole and $l'$ is the height of said projection.

11. A method as defined in claim 1, further comprising the step of imparting a ultrasonic vibration to said tubular electrode.

12. The method defined in claim 11 wherein said ultrasonic vibration is of a frequency less than 50 kHz.

13. The method defined in claim 12 wherein said frequency is not greater than 30 kHz.

14. The method defined in claim 11 wherein said ultrasonic vibration is of a frequency between 50 to 100 kHz.

15. The method defined in claim 11 wherein said ultrasonic vibration is of a frequency between 100 kHz and 10 MHz.

16. A method as defined in claim 11, further comprising the step of superimposing a low-frequency vibration upon said ultrasonic vibration imparted to said tubular electrode.

17. The method defined in claim 16 wherein said low-frequency vibration is of a frequency between 50 and 500 Hz while said ultrasonic vibration is of a frequency between 1 and 500 kHz.

18. A method as defined in claim 11 or claim 16, further comprising the step of changing the amplitude of said ultrasonic vibration as a function of the depth of the hole being machined.

19. A method as defined in claim 11, further comprising the step of changing the amplitude of said ultrasonic vibration in response to a change in a gap electrical variable.

20. A method as defined in claim 11, further comprising the step of periodically interrupting the ultrasonic vibration imparted to said tool electrode.

21. The method defined in claim 20 wherein the frequency of interruption of the ultrasonic vibration is in excess of 10 kHz and said ultrasonic vibration is of a frequency in excess of 100 kHz.

22. The method defined in claim 20 or 21 wherein said machining pulses are a succession of time-spaced or periodically interrupted trains of pulses, said pulses being of a frequency substantially equal to the frequency of said ultrasonic vibration and the frequency of interruption of the machining pulses being substantially equal to the frequency of interruption of said ultrasonic vibration.

23. The method defined in claim 11 wherein said electrode is urged against said workpiece in light contacting relationship therewith while said ultrasonic vibration is imparted to said electrode.

24. The method defined in claim 11 wherein said ultrasonic vibration is imparted to said elongated electrode longitudinally thereof.

25. The method defined in claim 11 wherein said ultrasonic vibration is imparted to said elongated electrode transversely thereto.

26. An apparatus for electrical discharge machining a small and deep hole of a diameter of 1 mm or less and a depth to diameter ratio of at least 5 into or through a workpiece, the apparatus comprising: a thin and elongated tubular electrode of at most a diameter of 0.5 mm juxtaposable with said workpiece to form a machining gap therebetween; fluid supply and pumping means for supplying a water machining fluid through said tubular electrode into said machining gap at a pressure of at least 20 kg/cm$^2$; power supply means for applying a series of electrical machining pulses between said electrode and said workpiece to produce a succession of electrical discharges through said machining gap thereby removing material from said workpiece; and drive means for relatively displacing said tubular electrode and said workpiece to advance said elongated electrode longitudinally into said workpiece.

27. The apparatus defined in claim 26 wherein said fluid supply and pumping means includes an ion-exchange device for maintaining the resistivity of said water machining fluid in excess of 10$^4$ ohm-cm.

28. The apparatus defined in claim 27 wherein said fluid supply and pumping means includes means for controlling the temperature of said water machining fluid substantially at a predetermined value.

29. The apparatus defined in claim 28 wherein said fluid supply and pumping means includes a pump for pumping said water machining fluid into said tubular electrode through fluid conduit means and an accumulator coupled to said fluid conduit means between said pump and said tubular electrode.

30. An apparatus as defined in claim 26, further comprising vibrator means for imparting an ultrasonic vibration to said tubular electrode.

31. The apparatus defined in claim 30 wherein said vibrator means is adapted to impart the ultrasonic vibration to the elongated electrode longitudinally thereof.

32. The apparatus defined in claim 30 wherein said vibrator means is adapted to impart said ultrasonic vibration transversely to said elongated electrode.

33. An apparatus as defined in claim 30, further comprising means for selectively changing the amplitude of said ultrasonic vibration.

* * * * *